(12) United States Patent
Klemm et al.

(10) Patent No.: US 12,406,573 B2
(45) Date of Patent: Sep. 2, 2025

(54) METHOD AND DEVICE FOR EVALUATING A FUNCTION FOR PREDICTING A TRAJECTORY OF AN OBJECT IN AN ENVIRONMENT OF A VEHICLE

(71) Applicant: Robert Bosch GmbH, Stuttgart (DE)

(72) Inventors: David Klemm, Besigheim (DE); Laura Beermann, Waldbronn (DE); Michael Mennicken, Friolzheim (DE); Sebastian Meyer, Cleebronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 355 days.

(21) Appl. No.: 17/935,507

(22) Filed: Sep. 26, 2022

(65) Prior Publication Data

US 2023/0128379 A1 Apr. 27, 2023

(30) Foreign Application Priority Data

Oct. 26, 2021 (DE) ...................... 10 2021 212 048.2

(51) Int. Cl.
*G08G 1/01* (2006.01)
(52) U.S. Cl.
CPC ................. *G08G 1/0104* (2013.01)
(58) Field of Classification Search
CPC ........ G08G 1/0104; G08G 1/166; G01C 7/04; G01C 21/20; G01S 13/931; G01S 5/0284;
(Continued)

(56) References Cited

U.S. PATENT DOCUMENTS 7,639,841 B2 * 12/2009 Zhu .................. G06V 40/20
382/160
8,340,883 B2 * 12/2012 Arbitmann ............ B60W 10/06
701/30.9
(Continued)

FOREIGN PATENT DOCUMENTS

DE 102016205761 A1 10/2017
DE 102018122115 A1 3/2020
DE 102020200133 A1 7/2021

OTHER PUBLICATIONS

SAE J3016 Surface Vehicle Recommended Practice, Taxonomy and Definitions for Terms Related to Driving Automation System for On-Road Motor Vehicles, 2018, pp. 1-35.

*Primary Examiner* — Mussa A Shaawat
(74) *Attorney, Agent, or Firm* — NORTON ROSE FULBRIGHT US LLP

(57) ABSTRACT

A method and device for evaluating a function for predicting a trajectory of an object in an environment of a vehicle. The method includes acquiring first environment data values representing the environment of the vehicle at a first point in time, and the first environment data values including a start position of the object and object parameters; determining a trajectory of the object as a function of the start position and the object parameters, the trajectory including a possible position of the object at a second point in time later than the first point in time; acquiring second environment data values representing the environment of the vehicle at the second point in time and including an actual position of the object; determining an agreement between the possible position and the actual position at the second point in time; and evaluating the function as a function of the agreement.

8 Claims, 3 Drawing Sheets

(58) Field of Classification Search
CPC ......... B60W 60/0011; B60W 2555/00; B60W 2556/55; B60W 2556/65; B60W 30/18163; B60W 50/0097
See application file for complete search history.

(56) References Cited

U.S. PATENT DOCUMENTS

| | | | | |
|---|---|---|---|---|
| 8,903,588 | B2* | 12/2014 | Schmudderich | G06V 20/588 701/96 |
| 9,308,916 | B2* | 4/2016 | Buerkle | B60W 30/0956 |
| 10,037,613 | B1* | 7/2018 | Becker | G06T 7/277 |
| 10,222,802 | B2 | 3/2019 | Kuttenberger | B62J 27/00 |
| 10,449,960 | B2* | 10/2019 | Keller | G06F 18/254 |
| 10,459,444 | B1* | 10/2019 | Kentley-Klay | G07C 5/008 |
| 10,816,636 | B2* | 10/2020 | Newman | H04W 4/40 |
| 11,279,351 | B2* | 3/2022 | Schmidt | B60W 30/18163 |
| 11,858,536 | B1* | 1/2024 | Liu | G06N 3/0464 |
| 11,960,291 | B2* | 4/2024 | Rudenko | G05D 1/0214 |
| 12,024,204 | B2* | 7/2024 | Fedorov | G01S 13/867 |
| 12,253,839 | B2* | 3/2025 | Van Duijkeren | G05D 1/0219 |
| 2005/0004762 | A1* | 1/2005 | Takahama | G01S 17/931 348/148 |
| 2009/0076702 | A1* | 3/2009 | Arbitmann | B60W 10/20 701/1 |
| 2011/0046843 | A1* | 2/2011 | Caveney | G08G 1/161 701/31.4 |
| 2011/0109578 | A1* | 5/2011 | Waller | G06F 3/04883 345/173 |
| 2013/0085659 | A1* | 4/2013 | Bekaert | G08G 9/00 701/118 |
| 2013/0138320 | A1* | 5/2013 | Aso | G08G 1/096741 701/96 |
| 2016/0267331 | A1* | 9/2016 | Pillai | G06T 15/06 |
| 2018/0204343 | A1* | 7/2018 | Galvane | G06T 7/70 |
| 2019/0235512 | A1* | 8/2019 | Sinyavskiy | G05D 1/0217 |
| 2020/0023842 | A1* | 1/2020 | Gutierrez | G06V 20/584 |
| 2021/0001884 | A1* | 1/2021 | Alvarez | B60W 40/06 |

* cited by examiner

METHOD AND DEVICE FOR EVALUATING A FUNCTION FOR PREDICTING A TRAJECTORY OF AN OBJECT IN AN ENVIRONMENT OF A VEHICLE

CROSS REFERENCE

The present application claims the benefit under 35 U.S.C. § 119 of German Patent Application No. DE 10 2021 212 048.2 filed on Oct. 26, 2021, which is expressly incorporated herein by reference in its entirety.

FIELD

The present invention, among other things, relates to a method for evaluating a function for predicting a trajectory of an object in an environment of a vehicle and includes a step of determining the trajectory of the object as a function of a start position and as a function of object parameters, the trajectory including at least one possible position of the object, a step of determining an agreement between the possible position and an actual position of the object, and a step of evaluating the function as a function of the agreement.

SUMMARY

A method according to the present invention is provided for evaluating a function for predicting a trajectory of an object in an environment of the vehicle, the function including function parameters. According to an example embodiment of the present invention, the method includes a step of acquiring first environment data values, which represent the environment of the vehicle at a first point in time, the environment including an object and the first environment data values including a start position of the object and object parameters, and a step of determining a trajectory of the object as a function of the start position and as a function of the object parameters, the trajectory including at least one possible position of the object at a second point in time, the second point in time being later than the first point in time. The present method furthermore includes a step of acquiring second environment data values which represent the environment of the vehicle at the second point in time, the second environment data values including an actual position of the object; a step of determining an agreement between the possible position and the actual position of the object at the second point in time; and a step of evaluating the function as a function of the agreement.

A vehicle is to be understood as a manually operated vehicle or an automated vehicle according to one of the SAE levels 1 to 5 (see SAE J3016 standard).

An acquisition of environment data values is to be understood as an acquisition of the environment of the vehicle with the aid of an environment sensor system. An environment sensor system should be understood as at least one video and/or at least one radar and/or at least one Lidar and/or at least one ultrasonic and/or at least one further sensor, which is designed to acquire an environment of the automated vehicle in the form of environment data values. The environment sensor system is particularly developed to acquire environment characteristics in the environment (road courses, traffic signs, roadway markings, buildings, road boundaries, etc.) and/or objects (vehicles, bicyclists, pedestrians, etc.). In one embodiment, the environment sensor system, for instance, includes a processing unit (processor, working memory, hard disk) provided with a suitable software and/or is connected to such a processing unit, which makes it possible to acquire and/or classify or allocate these environment characteristics.

An object in this case particularly means a further road user such as a further vehicle, for instance.

For example, a trajectory is to be understood as a line (continuous or as a concatenation of discrete points or positions), which the object follows. In one possible embodiment, a trajectory is to be understood as a trajectory corridor that is actually traveled in the form of a driving path according to the width of the object.

For instance, a function for predicting a trajectory, the function including function parameters, describes an algorithm which appropriately weights the individual variables of the algorithm as a function of the function parameters, and determines (predicts) a trajectory as a function of the variables, i.e., the start position of the object and (further) object parameters in this instance. For example, the object parameters are to be understood as a velocity and/or an acceleration of the object and/or a behavior of the object (a movement within a traffic lane, the object flashing or not flashing, etc.), and/or an embodiment of the object (vehicle, bicycle, etc.) and/or other object properties. An agreement, for example, is a difference or a distance between the actual position and the possible position, the function being evaluated as a function of the agreement, for instance in such a way that function parameters are adapted and/or the function is evaluated as not workable, etc. if the distance exceeds a predefined maximum distance.

In an advantageous manner, the method according to the present invention solves the task of providing a method for evaluating a function for predicting a trajectory of an object. This task is solved with the aid of the method according to the present invention in that a trajectory of the object is determined as a function of the start position and as a function of the object parameters and compared and evaluated at a later point in time to the ultimately actually used trajectory through a reconciliation. The knowledge or prediction of a movement behavior of objects (here in the form of a trajectory) is of fundamental and great importance for the safety of vehicles and particularly also for automated vehicles which must move while relying on sensors. Since such a prediction can basically never be precisely forecast but only estimated, it is of great importance that the functions used for this purpose are not only able to be trained but also validated.

According to an example embodiment of the present invention, the evaluation of the function preferably takes place by adapting at least one of the function parameters as a function of the agreement. For example, an evaluation of the function is to be understood as the training of the function.

The evaluation of the function preferably includes the supply of an enable signal to enable the function or of a deactivation signal to deactivate the function. In this case, an evaluation of the function is to be understood as a validation of the function, for instance.

According to an example embodiment of the present invention, the first and second environment data values are preferably transmitted to an external processing unit, the external processing unit carrying out the determination of the agreement between the possible position and the actual position.

An external processing unit, for example, is to be understood as a server or a cloud (a network of servers and/or processing units). To this end, the external processing unit includes the corresponding technical means (processor, working memory, hard disk) as well as a suitable software for carrying out the method(s) according to present invention. In addition, for example, the device includes a transmitter and/or receiver unit designed to transmit and/or receive data (environment data values, etc.) or is connected to a transmitter and/or receiver device with the aid of a suitable interface.

A device according to the present invention, in particular a control unit, is designed to carry out all the steps of the method according to one of the method steps for evaluating a function, according to the present invention.

To this end, according to an example embodiment of the present invention, the device particularly includes a processing unit (processor, working memory, memory medium) and a suitable software to carry out the method(s) according to the present invention. In addition, the device is provided with an interface to transmit and receive data values with the aid of a cabled and/or wireless connection, e.g., with further devices of the vehicle (control units, communication devices, environment sensor system, navigation system, etc.).

In addition, a computer program is provided, which includes instructions that upon an execution of the computer program by a computer induce the computer to carry out a method for evaluating a function as disclosed herein. In one embodiment, the computer program corresponds to the software included by the device.

In addition, a machine-readable memory medium is provided on which the computer program is stored.

Advantageous further refinements of the present invention are disclosed herein.

BRIEF DESCRIPTION OF THE DRAWINGS

Exemplary embodiments of the present invention are shown in the drawing and described in greater detail in the following description. The figures show.

DETAILED DESCRIPTION OF EXAMPLE EMBODIMENTS

Figure 1A:
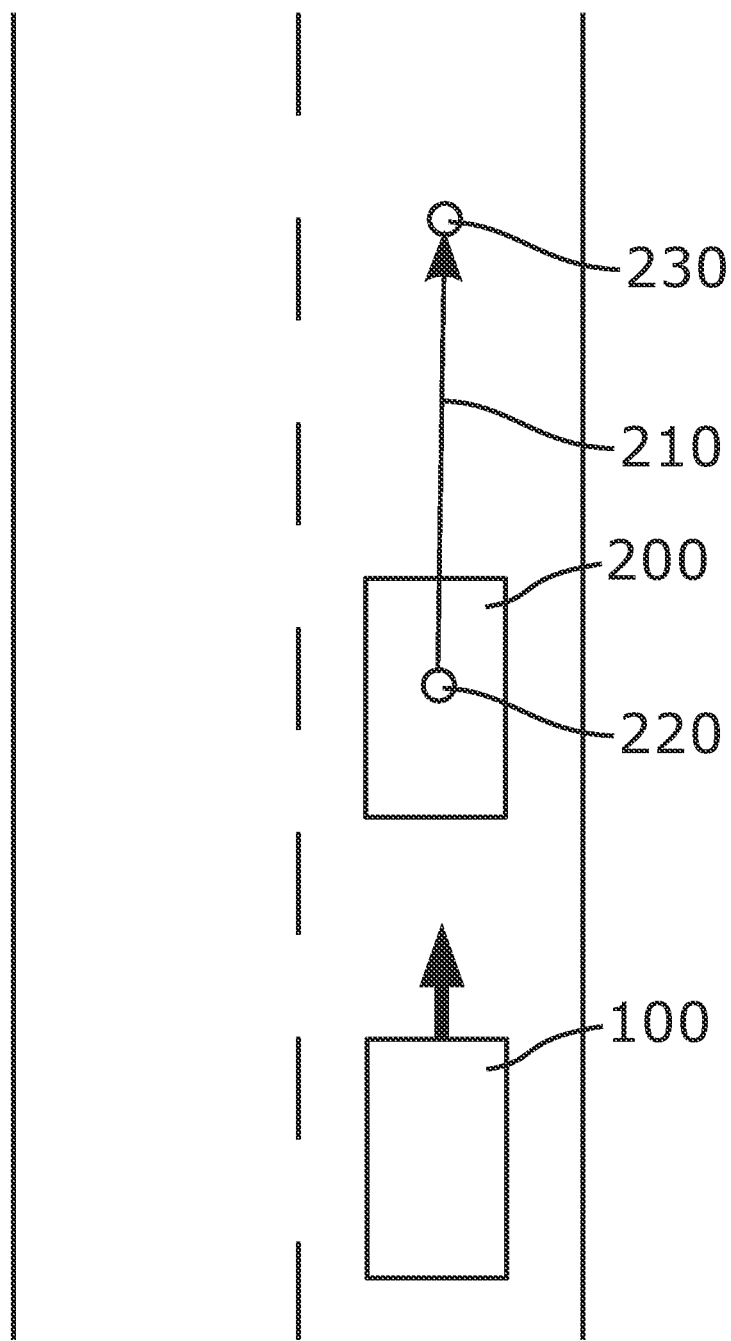
FIGS. 1A and 1B show the method for evaluating a function according to an example embodiment of the present invention.
Figure 1B:
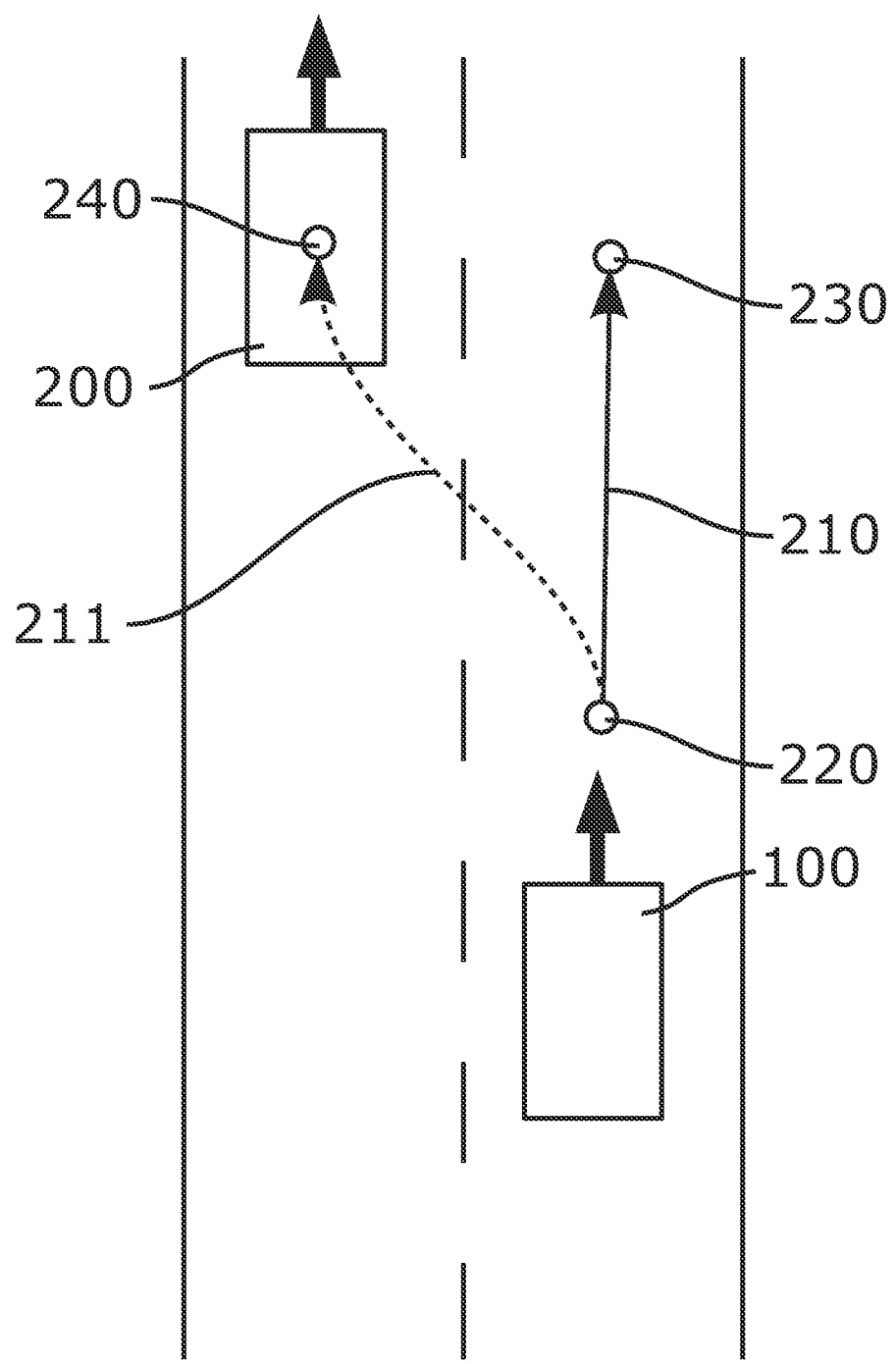

FIGS. 1A and 1B show an exemplary embodiment of method 300 according to the present invention.

FIG. 1A shows an environment of vehicle 100 at a first point in time. First environment data values which represent the environment of vehicle 100 at this first point in time are acquired with the aid of an environment sensor system of vehicle 100. The environment includes an object 200 (such as a vehicle in this instance) which, by way of example, is located in front of vehicle 100 in the driving direction (represented by corresponding arrows). The acquired environment data values include at least a start position 220 of object 200. This position information relates to a certain point of object 220 (here, simply by way of example and viewed from above, approximately in the center of object 220). Such position information is subject to a certain fuzziness so that the position information, for instance, includes information in GNSS coordinates and also fuzziness information.

Depending on start position 220 and depending on object parameters, a trajectory 210 of object 200 is determined or predicted. Trajectory 210 includes at least one possible position 230 of object 200 at a second point in time, the second point in time being later than the first point in time. For example, second point in time is selected or determined starting from a predefined difference to the first point in time. For instance, the difference between the second and the first point in time is selected in such a way that a prediction still appears plausible. If the difference is too large, then the meaningfulness of a prediction increasingly drops because of the multitude of possibilities as to where the object will later be located or how the objects is moving toward this point.

FIG. 1B shows an environment of vehicle 100 at the second point in time. Second environment data values are acquired, which represent the environment of vehicle 100 at the second point in time. The environment includes an actual position 240 of object 200. Here, merely by way of example, the actually used trajectory 211 of object 200 is shown in addition.

Next, an agreement between possible position 230 and actual position 240 of object 200 is determined and the function is evaluated as a function of the agreement.

Figure 2:
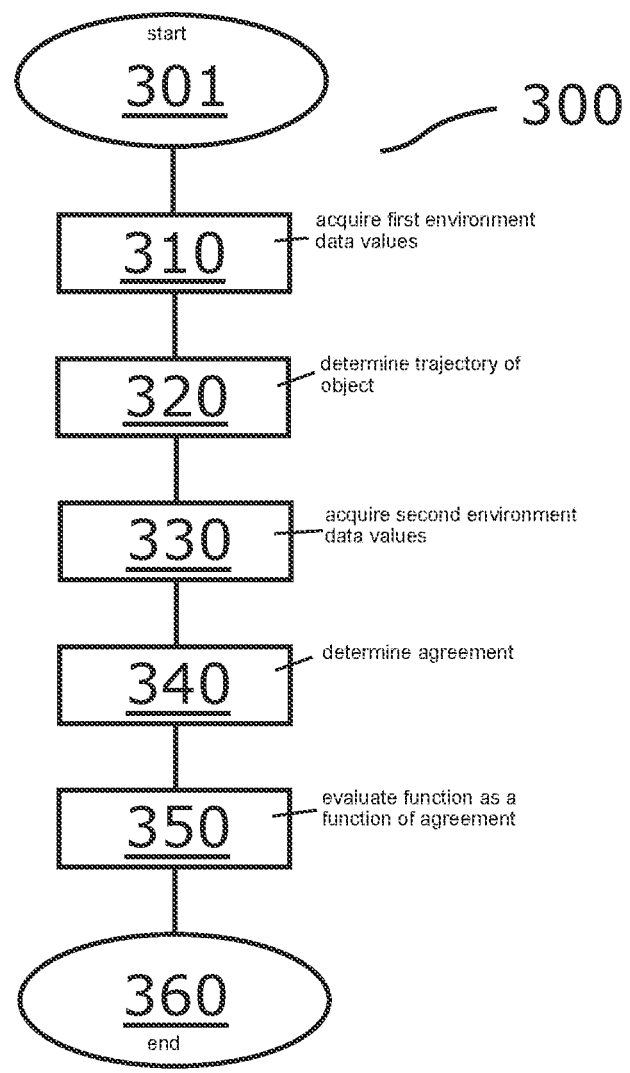
FIG. 2 shows an exemplary embodiment of the method for evaluating a function according to the present invention in the form of a flow diagram.

FIG. 2 shows a possible exemplary embodiment of a method 300 for evaluating 350 a function for predicting a trajectory 210 of an object in an environment of a vehicle 100.

In step 301, method 300 begins.

In step 310, first environment data values are acquired, which represent the environment of vehicle 100 at a first point in time, the environment including object 200, and the first environment data values including a start position 220 of object 200 and object parameters.

In step 320, a trajectory 210 of object 200 is determined as a function of start position 220 and as a function of the object parameters. Trajectory 210 includes at least a possible position 230 of object 200 at a second point in time, the second point in time being later than the first point in time.

In step 330, second environment data values are acquired, which represent the environment of vehicle 100 at the second point in time, the second environment data values including an actual position 240 of object 200.

In step 340, an agreement between possible position 230 and actual position 240 of object 200 at second point in time is determined.

In step 350, the function is evaluated as a function of the agreement.

In step 360, method 300 ends.

What is claimed is:

1. A method for an automated operation of a vehicle using a function for predicting trajectories of objects in an environment of the vehicle, the function including function parameters, the method comprising the following steps:
   acquiring, by a processor system that includes at least one processor, first environment data values, which represent the environment of the vehicle at a first point in time, the environment including a first object of the objects, and the first environment data values including a start position of the first object and object parameters of the first object;
   determining, by the processor system, a trajectory of the first object based on the start position and the object parameters, the determining of the trajectory including applying the start position and the object parameters to a position determining function that uses the start position and the object parameters to determine at least one possible position of the first object at a second point in time, the second point in time being later than the first point in time;

acquiring, by the processor system, second environment data values, which represent the environment of the vehicle at the second point in time, the second environment data values including an actual position of the second object;

evaluating, by the processor system, the position determining function, the evaluation including determining a degree to which there is disagreement between the possible position and the actual position of the first object at the second point in time;

adapting, by the processor system, at least one of the function parameters based on the determined degree of the disagreement; and subsequent to the adaptation:
  executing, by the processor system, the function, which operates during the execution with the adapted at least one function parameter to predict a future position of a second object of the objects in the environment of the vehicle; and
  performing, by the processor system, an autonomous drive operation of the vehicle based on the predicted future position of the second object.

2. The method as recited in claim 1, wherein the evaluation of the function takes place by adapting at least one of the function parameters as a function of the agreement.

3. The method as recited in claim 1, wherein the evaluation of the function includes a supply of an enable signal to enable the function, or of a deactivation signal to deactivate the function.

4. The method as recited in claim 1, wherein the at least one processor of the processor system includes a local processor and an external processor, the first and the second environment data values are transmitted by the local processor to the external processor, and the external processor carries out the determination of the degree of the disagreement between the possible position and the actual position.

5. The method of claim 1, wherein the adapting of the at least one of the function parameters includes an adjustment of the at least one function parameter to reduce the degree of the disagreement for the subsequent execution.

6. The method of claim 1, wherein the evaluation further includes determining whether the degree of the disagreement exceeds a predefined threshold degree of disagreement.

7. A device, comprising:
a control unit comprising a processor system that includes at least one processor, wherein, for an automated operation of a vehicle using a function that includes function parameters by which to predict trajectories of objects in an environment of the vehicle, the processor system is configured to:
  acquire first environment data values, which represent the environment of the vehicle at a first point in time, the environment including a first object of the objects, and the first environment data values including a start position of the first object and object parameters of the first object;
  determine a trajectory of the first object based on the start position and the object parameters, the determining of the trajectory including applying the start position and the object parameters to a position determining function that uses the start position and the object parameters to determine at least one possible position of the first object at a second point in time, the second point in time being later than the first point in time;
  acquire second environment data values, which represent the environment of the vehicle at the second point in time, the second environment data values including an actual position of the second object;
  evaluate the position determining function, the evaluation including determining a degree to which there is disagreement between the possible position and the actual position of the first object at the second point in time;
  adapt at least one of the function parameters based on the determined degree of the disagreement; and
  subsequent to the adaptation:
    execute the function, which operates during the execution with the adapted at least one function parameter to predict a future position of a second object of the objects in the environment of the vehicle; and
    perform an autonomous drive operation of the vehicle based on the predicted future position of the second object.

8. A non-transitory machine-readable memory medium on which is stored a computer program for an automated operation of a vehicle using a function for predicting trajectories of objects in an environment of the vehicle, the function including function parameters, the computer program, when executed by a computer, causing the computer to perform the following steps:
  acquiring first environment data values, which represent the environment of the vehicle at a first point in time, the environment including a first object of the objects, and the first environment data values including a start position of the first object and object parameters of the first object;
  determining a trajectory of the first object based on the start position and the object parameters, the determining of the trajectory including applying the start position and the object parameters to a position determining function that uses the start position and the object parameters to determine at least one possible position of the first object at a second point in time, the second point in time being later than the first point in time;
  acquiring second environment data values, which represent the environment of the vehicle at the second point in time, the second environment data values including an actual position of the second object;
  evaluating the position determining function, the evaluation including determining a degree to which there is disagreement between the possible position and the actual position of the first object at the second point in time;
  adapting at least one of the function parameters based on the determined degree of the disagreement; and
  subsequent to the adaptation:
    executing the function, which operates during the execution with the adapted at least one function parameter to predict a future position of a second object of the objects in the environment of the vehicle; and
    performing an autonomous drive operation of the vehicle based on the predicted future position of the second object.

* * * * *